July 7, 1970  H. L. BJELLAND  3,519,742
PHOTOCHROMIC DISPLAY USING CATHODE RAY TUBE
Filed Feb. 25, 1964  2 Sheets-Sheet 1

Inventor.
Harley L. Bjelland

By: Louis A. Kline
John T. Marlago
Dominick Nardelli
His Attorneys.

July 7, 1970  H. L. BJELLAND  3,519,742
PHOTOCHROMIC DISPLAY USING CATHODE RAY TUBE
Filed Feb. 25, 1964  2 Sheets-Sheet 2

Inventor.
Harley L. Bjelland
By: Louis A. Kline
John J. Matlago
Dominick Nardelli
His Attorneys.

United States Patent Office 3,519,742
Patented July 7, 1970

3,519,742
PHOTOCHROMIC DISPLAY USING CATHODE RAY TUBE
Harley L. Bjelland, Palos Verdes Peninsula, Calif., assignor to The National Cash Register Company, Dayton, Ohio, a corporation of Maryland
Filed Feb. 25, 1964, Ser. No. 347,181
Int. Cl. H04n 5/74
U.S. Cl. 178—7.85
14 Claims

ABSTRACT OF THE DISCLOSURE

An optical information display system utilizing a photochromic film which is normally transparent and is rendered opaque responsive to ultraviolet light. Exposure to ultraviolet light is provided by a cathode ray tube having a fiber optic face plate and a phosphor coating which emits ultraviolet light. Projection of the induced image on a display screen is accomplished in one embodiment by passing visible light through the photochromic film onto a dichroic filter. The light which is reflected by the dichroic filter passes back through transparent areas of the photochromic film and is displayed on a screen. In another embodiment, visible light is projected through the photochromic layer to a display screen on the opposite side of the layer.

---

This invention relates to optical data or information display apparatus and, more particularly, to apparatus for continuously projecting an amplified image of changing information on a fixed background onto a display screen.

In a copending U.S. patent application Ser. No. 78,389, filed Dec. 27, 1960, now Pat. No. 3,134,297, inventors Carl O. Carlson et al., and assigned to the same assignee as this application, there is disclosed a display system wherein the visibility or the persistency (time of presence) of pertinent portions of a displayed image may be controllably varied. Generally, this result is accomplished by projecting fixed information along an axis to form an optical image thereof at a first image plane which includes a metachromatic (hereinafter called photochromic) film. The photochromic film is normally in a clear transmissive state but is characterized by a point-to-point variation in the light transmissivity thereof in response to auxiliary radiation in the form of ultraviolet light. The information, temporarily written in the photochromic film by the auxiliary radiation, represents changing information to be included with the image of the fixed information to be displayed at a second image plane or viewing screen. It is thus noted that the photochromic film serves as an object plane upon which changing information is continually superimposed over the projected image of the fixed information, and from which the display image is instantaneously achieved by the second projection means of the system.

The above-mentioned Carlson et al. application teaches how mechanical writing means can be effectively employed to provide the changing information for writing on the photochromic film. However, in order to speed up the operation and provide a more highly reliable system, it is desirable to provide all electronic writing means for display systems and in this connection the above-mentioned Carlson et al. application also teaches that changing information in the form of an optical image may be provided by a spot of ultraviolet light taken from the face of a cathode ray tube. The system uses a mirror to reflect the ultraviolet light into alignment with an information-containing projection light beam and towards a writing lens. In this arrangement the optical distance between the photochromic film and the face of the tube is preferably the same as the optical distance between the photochromic film and the object means which supplies the information to the projection light beam. Since the cathode ray tube is required to be spaced from the photochromic film, a substantial portion of the relatively low level intensity light, as emitted by the cathode ray tube, is not available for writing on the photochromic film. Due to the fact that the material forming the photochromic film changes state at the molecular level, the photochromic film has a relatively "slow" response to the low intensity ultraviolet light. Therefore, the changing information must be repeatedly written onto the photochromic film by the cathode ray tube in order that an acceptable optical density of the pattern is obtained on the film. This slows up the overall operation of writing on the film.

It is thus seen that it is highly desirable to provide a photochromic display system in which the response time of the photochromic film to the output of the cathode ray tube is increased such that the system can receive changing information at a relatively faster rate. Such a system is highly desirable because it makes it possible to provide a highly fast acting and simplified electronic display system, especially since the memory characteristic of the photochromic film eliminates the need for an external memory continually supplying signals to retain information on a face of a conventional cathode ray tube.

The present invention is arranged to provide a focused light beam on the photochromic film by providing a fiber optic face plate on the cathode ray tube. The inside surface of the face plate is made spherically concave, and the outside surface is made flat for accommodating the photochromic film. The coating of phosphor on the inside spherical surface of the fiber optic face plate emits a spot of ultraviolet light when bombarded by the beam, which light is directed onto the film by the fiber optics. Thus, although the face plate is required to be relatively thick to provide the strength to maintain the vacuum within the tube, the fiber optics maintains the focus of the beam and therefore the spot of light as it passes through the plate, thus effectively having the light spot focused directly onto the flat photochromic film.

Therefore, an object of this invention is to provide an improved display system having all the advantages of a cathode ray tube combined with the advantages of using photochromic film for recording changing information.

Another object of this invention is to provide an improved projection system for projecting onto a screen an image representing changing information as obtained from a cathode ray tube superimposed over an image of fixed information.

Another object of this invention is to provide a cathode ray tube with a fiber optic face plate in which the inside surface is spherically concave and the outside surface is flat so that a non-distorted flat field image is produced on the outside surface.

Still another object of this invention is to provide an improved electronic display system for writing on a photochromic film with a cathode ray tube wherein the overall response time of writing on the photochromic film more nearly approaches the operating response time of the cathode ray tube so that rapidly changing information is capable of being recorded on the photochromic film.

Another object of this invention is to provide a cathode ray tube with a fiber optic face plate which can efficiently and rapidly write changing information on a photochromic film positioned against the face of the tube and to provide a projection system whereby the information written on the photochromic film can be projected in amplified form onto a screen at the same time the information is being written.

Still another object of this invention is to provide an improved projection system for projecting onto a screen superimposed images representing three color channels of changing information so that color images of changing information are obtained on the screen.

Briefly, the invention includes a cathode ray tube in which the face plate is made of parallelly disposed optical fibers or light pipes. The fibers are bonded to each other to form a fiber optic plate. To provide a non-distorted flat image field on the outside surface of the fiber optic face plate, the inside surface is made spherically concave and the outside surface is made flat. The inside concave surface of the fiber optic face plate is coated with a phosphor having the property of producing ultraviolet light. In the preferred embodiment of the invention, the outside surface of the fiber optic face plate is coated with a thin dichroic filter having the properties of transmitting ultraviolet light and of reflecting visible light. The photochromic film is placed next to the dichroic filter. When the high energy electron beam in the tube bombards the phosphor, ultraviolet light is emitted from a small spot of the phosphor. The fiber optic face plate relays the spot source of ultraviolet light to the outside surface. Since the dichroic filter passes ultraviolet light, an opaque spot is written on the photochromic film. Since the spot source of light deflects with the electron beam, a visible changing opaque pattern is immediately produced on the photochromic film with little or no loss in resolution. Because the photochromic material as used in the film has persistence or temporary memory, the pattern represents only the latest information. The pattern formed in the photochromic film is viewed by directing visible light rays onto the photochromic film. The opaque pattern formed on the photochromic film absorbs some of the visible light and the dichroic filter reflects specularly, i.e., reflects like a mirror, the remaining visible light. The reflected light including the opaque pattern on the photochromic film is projected as an image on a viewing screen by using a suitable optical system. Since background or fixed information is usually desired on the viewing screen, the optical system is made to first focus an image of the changing opaque pattern at an object plane. Background information is then supplied, for example, by a transparent film positioned at the object plane. The visible light rays passing through the transparent film are focused a second time by the optical system onto the viewing screen to form a composite image.

Other objects, advantages, and features of the present invention will become apparent from the consideration of the following description when taken in conjunction with the appended claims and the drawings wherein:

The present invention, like the invention disclosed in the above-mentioned Carlson et al. application, includes the utilization of a metachromatic or photochromic film on which is written changing information. The changing information is written with a moving light spot containing ultraviolet light. The changing information on the photochromic film is focused at a first image plane which includes a transparent film containing fixed information. A composite image, containing fixed and changing information, is then focused on a viewing screen. Photochromic materials, having the properties just described, are materials whose light transmission characteristics are controllably variable in response to variations of applied energy such as visible light and ultraviolet light. Such photochromic materials include, for example, elementary and complex spiropyrans and derivatives thereof. Specific examples of exemplary classes of such photochromic materials are given in the above-mentioned Carlson et al. application.

Figure 1:
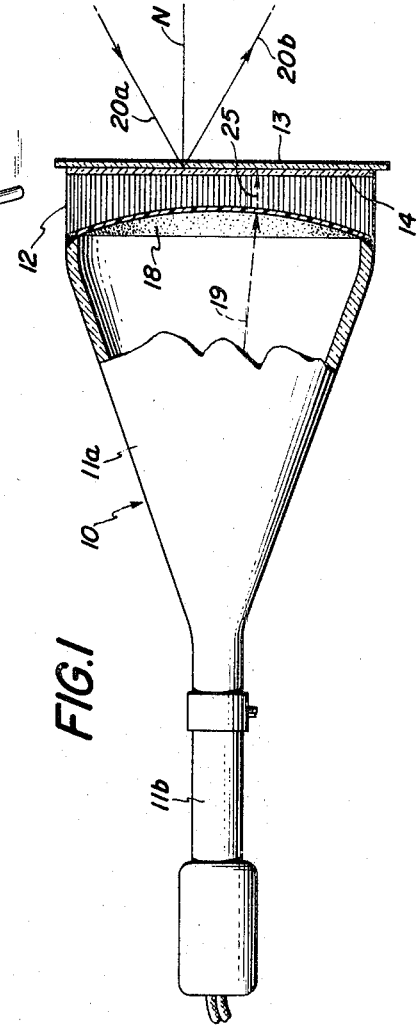
FIG. 1 is an enlarged view and partial section of an improved cathode ray tube for writing a visible, opaque trace on a photochromic film.

Referring to FIG. 1, there is shown an improved cathode ray tube 10 which writes on a photochromic film 13 placed against the tube. This tube has a conical glass envelope 11a with an electron gun (not shown) enclosed within a small neck portion 11b formed at one end. A relatively thick fiber optic face plate 12 covers the other end of the conical envelope 11a. The face plate 12 is suitably bonded to the conical envelope 11a so that a vacuum is maintained within the cathode ray tube.

Figure 2:
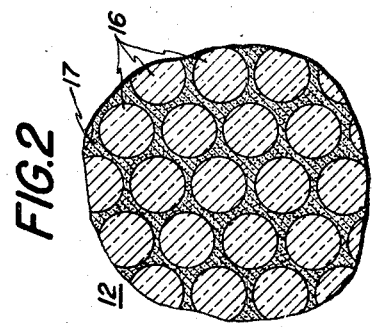
FIG. 2 is a greatly enlarged cross-section of a portion of a fiber optic plate forming the face plate of the cathode ray tube of FIG. 1.

For reasons that will be explained hereinafter, the inside surface of the face plate 12 is spherically concave while the outside surface is flat. A thin dichroic filter 14 is placed next to the flat outside surface of the face plate 12 and is preferably coated on the surface to provide intimate contact between the two. (The thickness of the filter 14 is greatly exaggerated for illustration purposes only.) The spherically concave inside surface of the face plate 12 is coated with a layer of phosphor 18 that emits ultraviolet light when bombarded with electrons. A typical phosphor is, for example, phosphor type P16 as classified in JEDEC (Joint Electron Device Engineering Council) Publication No. 16, dated June 1960, entitled "Optical Characteristics of Cathode Ray Tube Screens." When an electron beam 19, as produced by the electron gun, bombards the phosphor, ultraviolet light is emitted by the portion of phosphor directly in way of the beam 19. Since the electron beam is well focused, the ultraviolet light source is in the form of a small spot. The fiber optic face plate 12 relays the spot source of ultraviolet light to the outside surface of the face plate 12. When the electron beam is deflected by suitable means (not shown), the spot source on the outside surface also moves in direct relation to the movement of the beam since the fiber optic face plate has its fibers disposed parallel to the axis of the tube. An enlarged section of a portion of the fiber optic face plate 12 is shown in FIG. 2. The face plate 12 is made of many optical fibers 16 having a diameter of, for example, 8 microns. The fibers 16 function as light pipes. The space between the fibers 16 is filled with a light transparent filler material 17. The filler material 17 surrounds each fiber 16 so that the fibers are separated from each other with about a 1 micron spacing between two adjacent fibers 16. Since the filler material keeps the fibers spaced from each other, and since the filler material has a lower index of refraction than the fibers, for example, the indexes of refraction are 1.5 and 1.65 respectively, the filler material substantially prevents "crosstalk" between the fibers, i.e., the light entering the inside end of one of the fibers 16 is piped through the fiber and is emitted by the outside end of the same fiber.

As mentioned above, the phosphor 18 is of the type that emits ultraviolet light when bombarded by the electron beam 19. Selected fibers in the fiber optic face plate 12 relay the light spot to the outside of the tube in a path that is parallel to the axis of the tube, for example, as represented by arrow 25. Since the dichroic filter 14 has the property of transmitting ultraviolet light, i.e., light having a wavelength under 4,000 Angstroms, the ultraviolet light passes through the dichroic filter 14 to write an opaque spot on the film 13. Since the thickness of the filter 14 is about 2,000 Angstroms, the opaque spot formed on the film is unaffected, being approximately the same size as the light source on the phosphor. Opaque traces, symbols and letters can be written on the photochromic film 13 when the electron beam 19 is deflected. If the electron beam is also modulated as it is being deflected, as is done in a television tube, a pattern or picture with highlights and shadows could be written on the photochromic film.

The pattern formed on the film 13 has its highlights and shadows in approximately inverse order to those on the phosphor 18. Thus, practically all of the light produced by the cathode ray tube is absorbed by the film 13, and none of the light is available to project an image of the pattern at another plane. However, if a projection light beam containing visible light rays, represented by arrow 20a, is directed preferably at an angle to the normal N to the photochromic film 13, the rays pass through the film to the dichroic filter 14. Since dichroic filter 14 has the additional property of specularly reflecting angular visible light, i.e., light having a wavelength greater than 4,000 Angstroms, a reflected beam represented by arrow 20b is formed. Thus, the reflected beam contains the pattern on the photochromic film 13. It should be also noted that without the dichroic filter 14, the face plate 12 would produce a diffused reflection of visible light passing through the photochromic film 13, as the face plate 12 does not reflect like a mirror. A specular reflection is more efficient than a diffused reflection and is desirable when the pattern formed on the photochromic film 13 is to be projected and amplified on an enlarged screen, as will be described hereinafter.

The fiber optic face plate 12 on the cathode ray tube 10, besides providing a means for relaying the spot source to the outside surface, also provides a means for producing a flat field for the cathode ray tube. The electron gun in the tube 10 is of the type that has standard electromagnetic means (not shown) for deflecting the electron beam. The deflecting magnetic field and, in turn, the deflection current for the electromagnets are proportional to the sine of the beam deflection angle. Since the face plate 12 has a spherically concave inside surface with the center of radius located at the deflecting magnetic field, the deflection distance, from the axis of the tube 10 to the spot source bombarded by the beam 19, is also proportional to the sine of the deflection angle. Since the fiber optic plate 12 relays the spot source from the phosphor to the outside surface at the speed of light, the fiber optic face plate 12 is able to transform a spherical field to a flat field. The advantages of the spherically concave inside surface are that edge defocusing of the beam is greatly reduced, and that a linear ramp deflection current provides a constant velocity spot source on the flat outside surface. This is highly desirable with the photochromic film 13 as the persistence of the opaque spots is directly related to exposure time. In turn, exposure time is related to writing speed and light intensity. Uniform persistence of the photochromic film is desirable because the history of the changing information disappears in direct relation to time.

Figure 3:
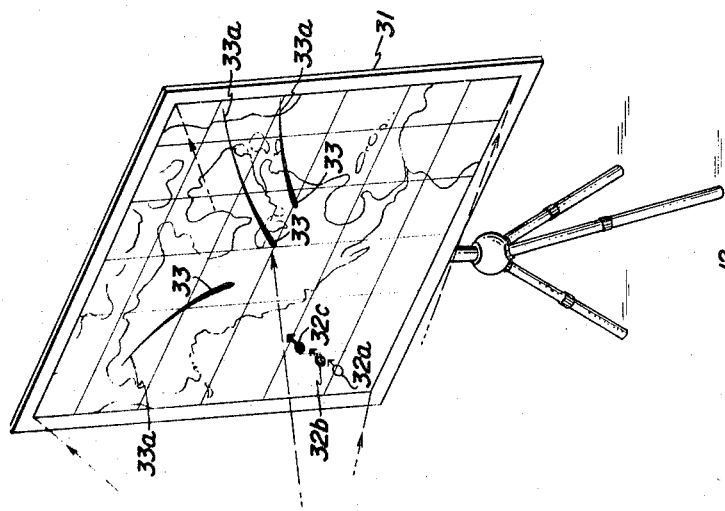
FIG. 3 is a pictorial and schematic view of an exemplary projection system employing the cathode ray tube and photochromic film, shown in FIG. 1, for changing the areal and intensity distribution of the projection light.

Referring to FIG. 3, an exemplary projection-type display system is shown that incorporates the cathode ray tube 10 illustrated in FIG. 1. The photochromic film 13 is positioned next to the face plate of the cathode ray tube 10 and is illuminated by a light source having a lamp 21 that preferably produces visible white light. A concentrated bundle of visible light rays 23 is formed by a reflector 22 which rays are directed at the photochromic film 13. The rays 23 are directed at an angle to the normal to the photochromic film 13. The bundle of light rays 23 passes through the photochromic film 13 in areas where the film is not opaque. The tube 10 also includes the ultraviolet pass dichroic filter 14 coated on the face plate 12, and the bundle of rays 23 is reflected by the dichroic filter to form a reflected bundle of rays 24 which contains the information printed on the photochromic film 13. As mentioned before, the dichroic filter produces specular reflection, and therefore the angle of incidence of the bundle of rays 23 is equal to the angle of reflection of the reflected bundle of rays 24. The reflection efficiency of the dichroic filter for visible light is relatively high, more than 50%. A relay lens 26 collects the bundle of rays 24 and focuses an image of the changing information at an object plane. An object means 27 is disposed at the object plane. The object means 27 is a transparency and contains fixed information. The light rays that pass through the object means 27 contain the fixed information and the changing information which the cathode ray tube 10 is writing on the photochromic film 13. The light rays, after passing through the object means 27, are collected by a suitable field lens 28 and directed to a suitable projection lens 29. The projection lens 29 projects a composite image representing fixed and changing information on a screen 31.

Screen 31 shows a map and grid representing fixed information that is supplied by the object means 27. Superimposed over the map are symbols, 32a, 32b and 32c, that could indicate, for example, a moving weather front. At the same time, three traces 33 are included on the screen. Each trace could indicate, for example, an aircraft approaching an airfield so that an air traffic control operator may visually "see" the traffic. The various traces 33 and symbols 32a, 32b and 32c can be written by "time sharing" the electron beam by using suitable standard control circuitry (not shown).

As mentioned above, the pattern written on the photochromic film has persistence. Therefore, symbol 32a which represents the oldest written history, is the lightest of the symbols. In turn, symbol 32b, since it is older than symbol 32c, is lighter than symbol 32c. It is to be noted that due to the persistence in the film, the traces 33 have disappearing tails 33a.

A cursor that appears as a real-time image on the screen 31, i.e., without history of past positions, may be readily added to the system. An image of the cursor is added to the screen 31 electronically by adding an additional image plane to the system in a manner that will be described hereinafter. The cursor is written on a photochromic film by another cathode ray tube such as tube 10. In order that the cursor appears on the screen as a real-time image, the persistence of the photochromic film on which the cursor is written is made relatively short, for example, less than one second. The persistence of the photochromic film is decreased by adding a second light source (not shown) similar to the light source comprising lamp 21 and reflector 22. Of these two light sources directed at the film, one supplies the projection beam and the second supplies light to shorten the persistency. The second light source does not affect the image contrast on the screen 31, as a lens such as relay lens 26 does not receive any of this light. A cursor could be a pointer similar to symbol 32a on the screen 31. Then if the symbol is rewritten immediately after it fades, the symbol appears as a steady image on the screen. A moving cursor could be also shown on the screen 31 by rewriting the cursor symbol at a new position displaced from the faded position.

Since the sensitivity of the photochromic film decreases with repeated exposures, means are provided to continually refresh the photochromic film. The means includes a thin layer (less than .001 inch) of photochromic material coated on a transparent and flexible polyester sheet made of, for example, Mylar. The fresh film is taken off roller 36 and passed across the face of the cathode ray tube 10 onto a take-up roller 37. The roller is suitably powered by an electric motor 38 so that the film 13 moves extremely slow, about one inch a day, across the face plate of tube 10. It should be understood that the film 13 is preferably positioned with the photochromic material in intimate contact with the face plate thereby preventing a double image from appearing on the screen. Also the various lenses in the system should be oriented parallel to photochromic film and the angle of incidence of the bundle of light rays 23 on the film should be made as small as possible in order to obtain on the screen 31 an image having minimum distortion.

Figure 4:
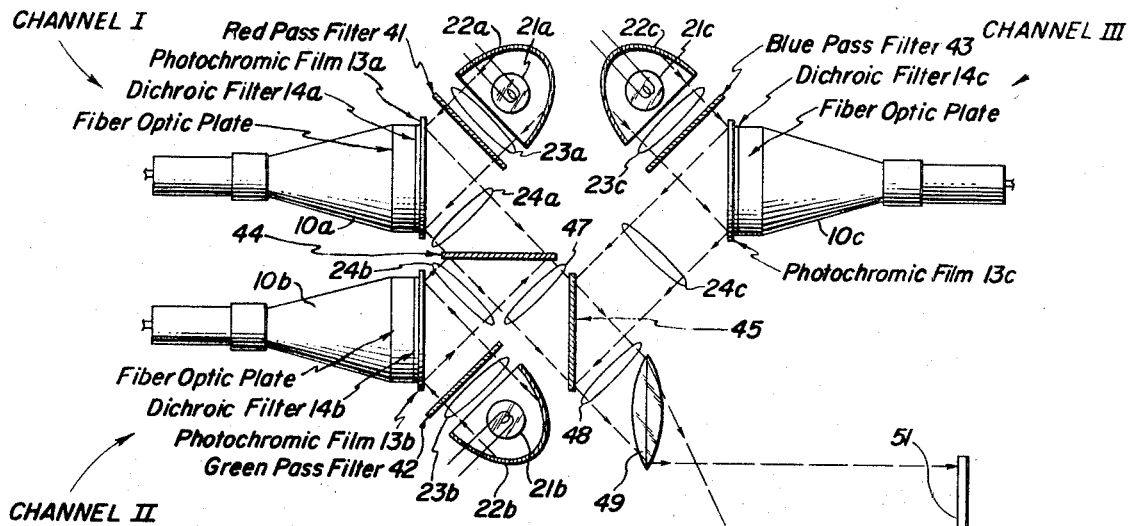
FIG. 4 is a schematic color projection system employing three cathode ray tubes of the type shown in FIG. 1.

Referring to FIG. 4, there is shown a projection type cathode ray display system. The figure shows, in particular, how parallel, addition of color image planes is accomplished from more than one cathode ray tube. Since photochromic film is a transparency with opaque patterns, parallel addition of color image planes is achieved by subtractive color techniques. Suitable beam combiners are used to add different colors of light by parallelly combining differently colored image planes. For example, channel I supplies red light; channel II supplies green light; and channel III supplies blue light. The channels I, II and III include cathode ray tubes 10a, 10b and 10c, lamps 21a, 21b, and 21c, and reflectors 22a, 22b, and 22c, respectively. Cathode ray tubes 10a, 10b, and 10c are similar to the cathode ray tube 10, as shown in FIG. 1, and are each coated with dichroic filters 14a, 14b, and 14c, respectively, which pass ultraviolet light similarly to dichroic filter 14. Against each respective dichroic filter 14a, 14b, and 14c is placed a photochromic film 13a, 13b, and 13c. Lamps 21a, 21b, and 21c, and reflectors 22a, 22b, and 22c, are similar to the lamp 21 and reflector 22, respectively, as shown in FIG. 3.

Reflector 22a in channel I directs a bundle of light rays 23a through a red pass filter 41 towards the photochromic film 13a. The dichroic filter 14a specularly reflects the red light rays, transmitted through the photochromic film 13a, and forms a bundle of red light rays 24a. The pattern written on the photochromic film 13a by tube 10a represents the information minus the red color. Reflector 22b in channel II directs a bundle of light rays 23b through a green pass filter 42 towards the photochromic film 13b. The dichroic filter 14b specularly reflects the green light rays, transmitted through the photochromic film 13b, and forms a bundle of green light rays 24b. The pattern written on film 13b by the tube 10b represents the information minus the green color. The bundle of red light rays 24a passes through a light beam combined, for example, a half-silvered mirror 44 while the bundle of green light rays 24b is reflected by the half-silvered mirror 44. The mirror 44 thus combines the bundle of red light rays 24a with the bundle of green light rays 24b to form a bundle of red-green light rays 47.

Now blue light is supplied to the system. Reflector 22c in channel III directs a bundle of light rays 23c through a blue pass filter 43 towards the photochromic film 13c. The dichroic filter 14c specularly reflects the blue light rays, transmitted through the photochromic film 13c, and forms a bundle of blue light rays 24c. The pattern written on the photochromic film by the tube 10c represents the information minus the blue color. The bundle of red-green light rays 47 passes through another half-silvered mirror 45, while the bundle of blue light rays 24c is reflected by the half-silvered mirror 45. The two bundles of rays are thus combined by the mirror 45 and a bundle of rays 48 is formed which bundle contains the information in full color. A projection lens 49 focuses the information in the bundle of rays 48 as a color image on a screen 51. According to good optical practice, the projection lens 49 is disposed optically parallel to the photochromic films 13a, 13b, and 13c and to the screen 51. Also, the optical distances from each photochromic film 13a, 13b, and 13c to the projection lens 49 are made equal to each other. Since the bundle of rays 48 is directed at an angle to the axis of the lens 49, the lens 49 preferably has good wide angle characteristics. Suitable dichroic filters could be substituted for the half-silvered mirrors 44 and 45. In FIG. 4, the angle of incidence of the projection beams on the photochromic films is exaggerated in order to clearly show how parallel combination of image planes could be accomplished. The angle of incidence should be made as small as possible in order to obtain an image with minimum distortion.

In order to project an image that appears to move, which image is obtained from the cathode ray tube, the photochromic material in films 13a, 13b, and 13c should have a persistence equal to or less than the time the cathode ray tube forms one image frame. The persistence of the photochromic material could be controlled by auxiliary light sources (not shown) whose intensities are controllable. Since the photochromic films 13a, 13b, and 13c also lose sensitivity after repeated use, means similar to the means shown in FIG. 3 for refreshing the photochromic film can be added to each channel in the system shown in FIG. 4. The system shown in FIG. 4 need not be limited to a color projection system. The projection system could be used to show superimposed black and white images. The persistence of each of the photochromic films 13a, 13b, and 13c could also be different from each other whereby the persistency of one is longer than another. This produces various results. For example, flashing symbols, moving symbols, and stationary symbols could be produced at one time.

Figure 5:
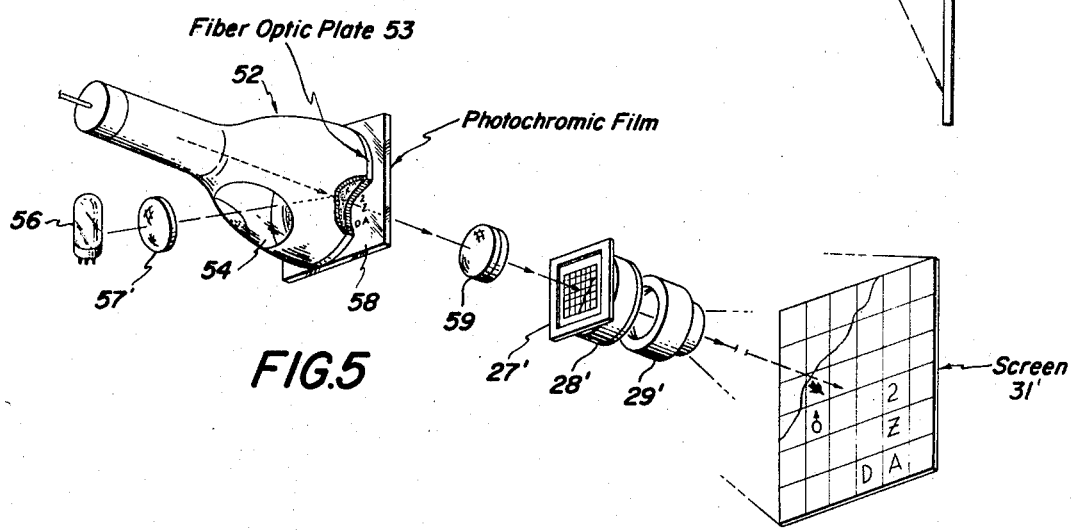
FIG. 5 is a pictorial and schematic view of another embodiment of a cathode ray tube projection system also using photochromic film for changing the areal and intensity distribution of the projected light.

Referring to FIG. 5, another embodiment of the invention is shown. This embodiment passes the projection beam one way through the photochromic film and has an advantage over the system shown in FIG. 3 in that the optical system is simpler than the optical system shown in FIG. 3 inasmuch as the main elements of the system are aligned coaxial with the optical axis of the projection lens. This system also uses visible light passing through the photochromics to amplify the low level output of a cathode ray tube. However, the transmission efficiency of the visible light through the cathode ray tube is relatively low. Therefore, less light is available for projecting an image than in the system shown in FIG. 3. This system also utilizes a cathode ray tube 52 having a fiber optic face plate 53. The fiber optic face plate 53 is bonded to the conical envelope of tube 52 in the same manner that the fiber optic face plate 12 is bonded to tube 10 in FIG. 1. However, the cathode ray tube 52 has a transparent window 54 in the glass envelope so that the visible light from a lamp 56 illuminates the inside surface of the face plate 53 and the phosphor coated thereon. Lens 57 forms a concentrated light beam for illuminating the inside surface of the face plate 53. Since the phosphor is thin, it is relatively transparent and some of the visible light rays pass through the phosphor. One of the functions of the fiber optic face plate 53 is to redirect the visible light rays along the axis of the tube 52. The visible rays pass through a photochromic film 58 to a relay lens 59 which lies coaxial with the tube axis and focuses the pattern written on the photochromic film 58 at an object plane. The photochromic film 58 is similar to the photochromic film 13 in FIG. 1 on which film 58 the cathode ray tube 52 is able to write a pattern, for example, symbols 2, Z, A, D, etc. Film 58 is also positioned against the face plate 53. A dichroic filter such as filter 14 is not coated on the face plate 53 in this embodiment because the visible light rays from lamp 56 are required to pass through the fiber optic face plate 53 and then through the photochromic film 58. This arrangement still requires that the fiber optic face plate relays the image formed on the phosphor to the outside surface of the face plate in order that the ultraviolet light, as produced by the phosphor, efficiently writes the pattern on the film.

As in the projection system shown in FIG. 3, an object means 27' is placed at the object plane of the projection system of FIG. 5. The object means 27' is also a transparency and fixed information is added to the visible light rays. Relay lens 28' and projection lens 29' focus a superimposed image on a screen 31'. The optical axes of both lenses 28' and 29' are placed coaxial with the axis of the tube 52. A parallel combination of patterns from various photochromic films could also be performed using the projection system and the cathode ray tube 52 of this embodiment.

Various other embodiments and variations of the present invention are contemplated and will become apparent to those skilled in the art without departing from the spirit and scope of the invention. Therefore, the invention is not limited to the exemplary embodiments, but includes all embodiments within the scope of the claims.

What is claimed is:

1. An optical information display system comprising: a cathode ray tube having a fiber optic face plate and a phosphor coating on the inside surface thereof, the phosphor of said coating having the property of producing light of a first wavelength band when bombarded with electrons; a normally transparent film disposed next to said fiber optic face plate, said film being comprised of a material which is rendered opaque in response to light of said first wavelength band; means for passing light of a second wavelength band through said normally transparent film; said cathode ray tube being controlled to focus a beam of electrons on said phosphor coating for writing an opaque trace on said film; first optical means for collecting light of said second wavelength band passing through said film; and second optical means cooperating with said first optical means for projecting an image of said trace on said film at an image plane.

2. An optical information display system comprising: a cathode ray tube having a fiber optic face plate and a phosphor coating on the inside surface thereof, the phosphor of said coating having the property of producing light of a first wavelength band when bombarded with electrons; a thin dichroic filter disposed on the outside surface of said fiber optic face plate, said dichroic filter having the properties of transmitting light of said first wavelength band and of reflecting light of a second wavelength band; a normally transparent film disposed next to said dichroic filter, said film being comprised of a material which is rendered opaque in response to light of said first wavelength band; said cathode ray tube being controlled to focus a beam of electrons on said phosphor coating for writing an opaque trace on said film; means for passing light of said second wavelength band through said film and onto said dichroic filter; first optical means for collecting light of said second wavelength band reflected by said dichroic filter; and second optical means cooperating with said first optical means for projecting an image of said trace at an image plane.

3. An optical information display system comprising: a cathode ray tube having a fiber optic face plate and a phosphor coating on the inside surface thereof, the phosphor of said coating having the property of producing light of a first wavelength band when bombarded with electrons; a normally transparent film disposed next to said fiber optic face plate, said film being comprised of a material which is rendered opaque in response to light of said first wavelength band; means for passing light of a second wavelength band through said film; means controlling said cathode ray tube to focus an electron beam on said phosphor coating to write an opaque trace on said film; first lens means for collecting light of said second wavelength band passing through said film and projecting an image of said trace on a first image plane; object means containing a pattern on a transparency disposed at said first image plane; and second lens means for collecting light passing through said object means and projecting said light to form a composite image on a screen.

4. An optical information display system comprising: a cathode ray tube having a fiber optic face plate and means for forming an electron beam, said fiber optic face plate having a concave inside surface and a flat outside surface; a phosphor coating on said concave inside surface having the property of producing light of a first wavelength band when bombarded by the electron beam formed by said tube; a normally transparent film disposed next to said fiber optic face plate, said film being comprised of a material which is rendered temporarily opaque in response to light of said first wavelength band; means controlling the beam of said cathode ray tube to write an opaque trace on said film; said concave inside surface of said fiber optic face plate being shaped for maintaining a uniformly focused electron beam on said phosphor coating irrespective of the displacement of the beam over the face of the tube; and a thin layer interposed between said film and said fiber optic plate, said layer being chosen to have the property of transmitting light of said first wavelength band while specularly reflecting light of a second wavelength band to which said film is relatively unresponsive as compared to light of said first wavelength band.

5. An optical information display system comprising: at least two cathode ray tubes each having a fiber optic face plate and a phosphor coating on the inside surface thereof, the phosphor of said coating having the property of producing ultraviolet light when bombarded with electrons; a thin dichroic filter disposed on the outside surface of the fiber optic face plate of each of said tubes, said dichroic filter having the property of transmitting ultraviolet light and of reflecting visible light; a photochromic film disposed next to the dichroic filters of each of said tubes, said films having the property of being rendered opaque in response to ultraviolet light; means for independently controlling the beams of each of said cathode ray tubes to write an opaque trace on its respective film; means including a light source and cooperating optical means for passing visible light through each of said photochromic films onto said dichroic filters; first optical means for collecting visible light reflected by each of said dichroic filters; a beam combiner cooperating with said first optical means for combining visible light reflected by each of said dichroic filters; and second optical means cooperating with said beam combiner for projecting the combined visible light onto an image plane to form a composite image of the traces formed on each of said films so that at least two different types of changing information are represented in said composite image.

6. An optical information display system comprising: a cathode ray tube having a fiber optic face plate and having means for forming an electron beam; said fiber optic face plate having a concave inside surface and a flat outside surface; a phosphor coating on said concave inside surface having the property of producing ultraviolet light when bombarded with the electron beam formed by said tube; a photochromic film disposed next to said fiber optic face plate, said film being comprised of a material which is rendered temporarily opaque in response to ultraviolet light; means for controlling the electron beam of said cathode ray tube to write an opaque trace on said film; said concave inside surface of said fiber optic face plate being shaped to transmit a uniform light spot onto said flat outside surface as said electron beam bombards said phosphor coating irrespective of the displacement of the beam over the face of the tube so that the decay time of the opaque trace is related to the intensity of said electron beam; means for passing light of a second wavelength band through said photochromic film, said second wavelength band being chosen so that said photochromic film is relatively unresponsive thereto as compared to said first wavelength band.

7. For use in an optical information display system: a cathode ray tube having a fiber optic face plate and means for directing a focused electron beam onto said face plate; said fiber optic face plate having a concave inside surface and a flat outside surface; a phosphor coating on said concave inside surface having the property of producing light having a wavelength band outside of the visible wavelength band when bombarded with said electron beam; said concave inside surface of said fiber optic face plate being shaped to transmit a uniform light spot onto said flat outside surface as said beam bombards said phosphor coating irrespective of the displacement of the beam over the face plate of the tube; said cathode ray tube having a side portion which is transparent to visible light and which is located so as to permit visible light to be transmitted to said flat outside surface via said portion and said fiber optic face plate.

8. An optical information display system comprising: at least two cathode ray tubes each having a fiber optic face plate and a phosphor coating on the inside surface thereof, the phosphor of said coating having the property of producing light of a first wavelength band when bombarded with electrons; a normally transparent film disposed next to the fiber optic face plate of each of said tubes, said films being comprised of a material which is rendered opaque in response to light of said first wavelength band; means for passing light of a second wavelength band through each of the films; each of said cathode ray tubes being controlled to focus a beam of electrons on said phosphor coating for writing an opaque trace on its respective film; first optical means for collecting light of said second wavelength band passing through each film; a beam combiner cooperating with said first optical means for combining light of said second wavelength band passing through each film; and second optical means cooperating with said beam combiner for projecting the combined light of said second wavelength onto an image plane to form a composite image of the traces formed on each film so that at least two different types of changing information are contained in said composite image.

9. An optical information display system comprising: a cathode ray tube having a front face plate, said cathode ray tube being constructed and arranged to provide an electronically controllable spot of light of a first wavelength band on said face plate; means for producing light of a second wavelength band; a photochromic film disposed closely adjacent said face plate, said photochromic film being characterized by a point-to-point variation in its transmissivity with respect to light of said second wavelength band in response to light of said first wavelenth band; means for applying light of said second wavelength band to said photochromic film; means located with respect to said photochromic film for receiving light of said second wavelength band after passing through said photochromic film, said last mentioned means being constructed and arranged to transmit light of said first wavelength band while specularly reflecting light of said second wavelength band back through said photochromic film; and optical means for displaying the information contained in the light of said second wavelength after being reflected back through said photochromic film.

10. The invention in accordance with claim 9, wherein said means for producing light of said second wavelength band includes a color filter for restricting the light of said second wavelength band to a predetermined color.

11. A display system comprising a cathode ray tube with a fiber optic face plate, said fiber optic face plate having disposed on its interior surface a phosphor which when scanned by an electron beam emits ultraviolet light and having disposed adjacent its exterior surface a photochromic film in which opacity differences are induced in response to excitation by said ultraviolet light, and optical means for displaying said opacity differences on a projection screen.

12. A photochromic display system comprising: photochromic means, means for exciting said photochromic means to form opacity differences therein, means for projecting light onto one surface and through said photochromic means, and means for reflecting said projected light back through said photochromic means.

13. For use in an optical information display system: a cathode ray tube having a fiber optic faceplate and means for directing a focused electron beam onto said faceplate; said fiber optic faceplate having an inside surface and an outside surface; a phosphor coating on said inside surface having the property of producing light having a wavelength band outside the visible wavelength band when bombarded with said electron beam; said cathode ray tube having a side portion which is transparent to visible light and which is located so as to permit visible light to be transmitted to said outside surface via said portion and said fiber optic faceplate.

14. A display system comprising a cathode ray tube with a fiber optic faceplate, said fiber optic faceplate having disposed on its interior surface a phosphor which when scanned by an electron beam emits light having a wave-length outside the visible wavelength band and having disposed adjacent its exterior surface a photochromic film in which opacity differences are induced in response to excitation by said emitted light, and optical means for displaying said opacity differences on a projection screen.

References Cited

UNITED STATES PATENTS

| | | | |
|---|---|---|---|
| 2,979,632 | 4/1961 | MacNeille | 178—6 |
| 3,225,138 | 12/1965 | Montani | 178—7.2 |
| 2,969,274 | 1/1961 | Roberts et al. | |
| 3,085,469 | 4/1963 | Carlson. | |
| 3,134,297 | 5/1964 | Carlson et al. | |
| 2,969,474 | 1/1961 | Roberts et al. | |

OTHER REFERENCES

"Research and Development" Brochure by National Cash Register Company, Received in U.S. Patent Office Mar. 14, 1960.

RICHARD MURRAY, Primary Examiner

R. L. RICHARDSON, Assistant Examiner

U.S. Cl. X.R.

178—5.4, 7.5, 7.86, 7.87; 350—160